UNITED STATES PATENT OFFICE.

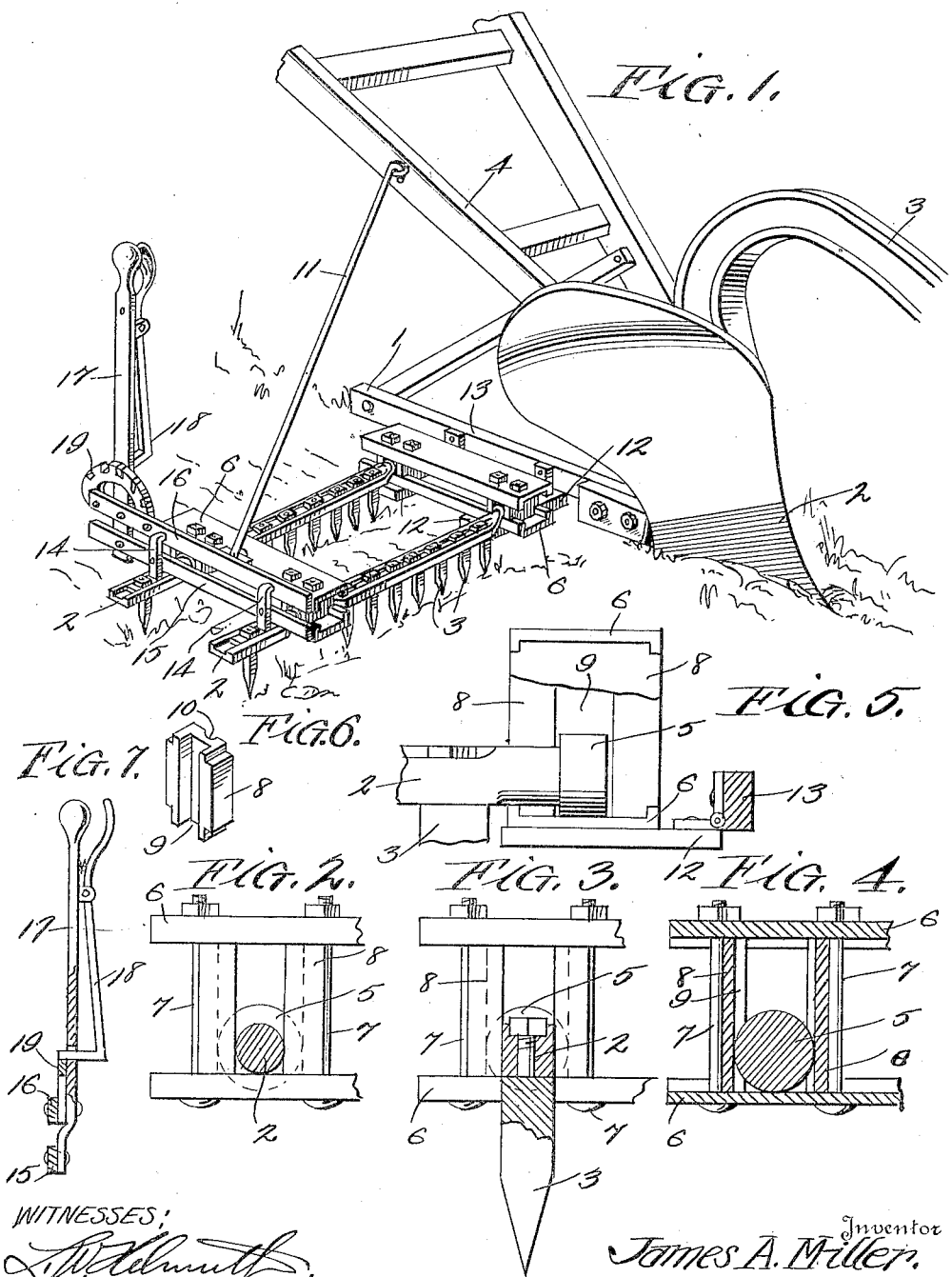

JAMES ARCHIE MILLER, OF BEEVILLE, TEXAS.

PLOW ATTACHMENT.

1,345,869.  Specification of Letters Patent.  Patented July 6, 1920.

Application filed March 6, 1920. Serial No. 363.637.

*To all whom it may concern:*

Be it known that I, JAMES A. MILLER, a citizen of the United States, residing at Beeville, in the county of Bee and State of Texas, have invented certain new and useful Improvements in Plow Attachments, of which the following is a specification.

The present invention relates to agricultural implements and more particularly to an attachment for use in connection with a turning plow whereby the soil may be prepared simultaneously with the plowing thereof for reception of the seed, thereby reducing the labor to the smallest amount possible and enabling the land to be prepared in a relatively short time.

The invention consists of a harrow attachment adapted to be attached to a turning plow whereby the land is harrowed at the same time the earth is turned during the plowing operation.

The attachment is of a nature to be readily applied to any turning plow and is so connected as to admit of its being thrown upward out of the way when not required for immediate use so that the plow may be used in its ordinary capacity for turning the soil.

The invention furthermore consists of an attachment comprising toothed bars which are mounted to admit of adjustment of the teeth so as to occupy a perpendicular or a forward of rearward inclination at any desired angle, said bars being mounted to yield and thereby prevent injury to the teeth of the attachment in the event of a root, boulder or other obstacle being encountered.

The drawings illustrate a preferred embodiment of the invention. However, it is to be understood that in adapting the same to meet different conditions, various changes in the form, proportions and minor details of construction may be resorted to without departing from the nature of the invention as claimed hereinafter.

Referring to the drawings hereto attached:—

Figure 1 is a perspective view of a part of an ordinary turning plow provided with an attachment embodying the invention, the same being in operative position.

Fig. 2 is a detail view of one of the toothed bars and the mounting therefor,

Fig. 3 is a view similar to Fig. 2 showing the relative position of the teeth,

Fig. 4 is a sectional detail through the bearing of one of the toothed bars,

Fig. 5 is a detail view of the inner end of a toothed bar and the mounting therefor showing the latter hingedly connected to a supporting bar.

Fig. 6 is a detail perspective view of an element of a toothed bar mounting,

Fig. 7 is a detail view of the operating lever and parts associated therewith whereby the toothed bars are held in an adjusted position.

Corresponding and like parts are referred to in the following description and indicated in the several views of the drawings by like reference characters.

Inasmuch as the invention is adapted to be applied to a turning plow the latter is illustrated in Fig. 1 and is of ordinary construction comprising the usual land side 1 in addition to the plow shovel 2, beam 3 and handle bars 4.

The attachment is connected to the plow in a manner to admit of its being thrown into upward position so as to be out of the way thereby enabling the plow to be used in its ordinary capacity. The attachment comprising a plurality of toothed bars 2 which are disposed in parallel position and mounted for partial rotation and adjustment to admit of the teeth clearing clods, roots and other objects which would tend to disable the attachment. The teeth 3 may be secured to the bars 2 in any manner and as indicated most clearly in Fig. 3, the upper ends of the teeth are reduced and pass through openings in the bars 2 and receive nuts on their projecting ends. In this manner the teeth may be replaced or relatively adjusted as required. Each toothed bar is provided at or near each inner end with a rounded portion 5 which constitutes a bearing. As shown most clearly in Fig. 1 pairs of bars are provided for the inner and outer ends of the toothed bars and these several bars are channeled and the bars of each pair are arranged with the channels facing inward. This is indicated most clearly in Figs. 1 and 5. The channeled bars are designated by the numeral 6 and are connected by bolts 7. Plates or struts 8 are interposed between the channel bars of each pair and serve to space them apart the required distance. The opposing sides of the struts are recessed as indicated at 9 so as to receive the bearing portions 5 of the toothed bars. The upper and lower corners of the struts 8 are notched as indicated most clearly in Fig. 6 to provide clearance for the flanges of the channel bars 6. The outer sides of the struts 8 are grooved as indicated at 10 to receive the bolts or fastenings 7. The struts 8 may be of any length so as to make provision for vertical movement of the toothed bars whereby the teeth thereof are enabled to clear roots, boulders and like obstacles. A pair of struts 8 is provided for each bearing portion 5 of the toothed bars 2 as indicated most clearly in Fig. 1. When the parts are assembled the bearing portions 5 of the toothed bars 2 engage the recessed or channeled sides 9 of the struts 8 and are retained in position thereby. It will thus be understood that the toothed bars may be turned to adjust the inclination of the teeth and in any adjusted position, the toothed bars are adapted to move vertically to enable the teeth to clear obstacles.

When the attachment is in position it is held extended by means of a suitable rod 11 which is interposed between one of the handle bars 4 and the outer end of the attachment as indicated in Fig. 1. The attachment may be turned so as to occupy a vertical position and thereby be out of the way when the plow is used for turning the soil simply. The inner pair of channel bars is secured to short bars 12 and these short bars are hingedly connected to a longitudinal bar 13 which in turn is suitably connected to the land side 1 of the plow in any manner. The outer ends of the toothed bars project beyond the outer pair of channel bars. Posts 14 are secured to the projecting ends of the toothed bars 2 and extend vertically and are pivotally connected to parallel longitudinally disposed bars 15 and 16.

An operating lever 17 is pivotally connected to the bars 15 and 16 and is provided with a hand latch 18 of suitable construction and arrangement. A toothed bar 19 is connected to one of the bars as 16 and its teeth coöperate with the engaging portion of the hand latch 18 to secure the operating lever and the longitudinal bars 15 and 16 in the required position thereby fixing the adjustment of the toothed bars so as to hold the teeth in the required position. By proper manipulation of the operating lever 17 the toothed bars 2 may be rocked and secured in adjusted position thereby holding the teeth in the required position whether vertical or inclined forwardly or rearwardly.

Having thus fully described my invention what I claim as new and desire to secure by Letters Patent, is:—

1. An attachment of the character specified, comprising relatively inner and outer longitudinally disposed supporting bars, and a plurality of transversely arranged toothed bars having their end portions mounted in the supporting bars and adapted to have independent or concurrent vertical movement at both ends.

2. An attachment of the character specified, comprising relatively inner and outer longitudinally disposed supporting bars, and a plurality of transversely arranged toothed bars having their end portions loosely journaled in the supporting bars to have independent or concurrent vertical movement and to turn for adjusting the inclination of the teeth at any vertical adjustment.

3. An attachment of the character specified comprising supporting bars, toothed bars having circular bearing portions, and struts receiving the bearing portions of the toothed bars between them and having the opposing sides recessed to receive the circular bearing portions of the toothed bars to hold them in given position and admit of rotation being imparted thereto and independent vertical movement.

4. In an attachment of the character specified, a plurality of toothed bars mounted to have a rotary movement imparted thereto, elements disposed perpendicularly to the toothed bars, parallel bars having said elements pivotally connected thereto, an operating lever pivotally connected to each of said parallel bars and provided with a hand latch, and a toothed bar carried by one of said parallel bars and adapted to be engaged by said hand latch whereby to hold the operating lever and toothed bars in the required adjusted position.

In testimony whereof I affix my signature in presence of two witnesses.

JAMES ARCHIE MILLER.

Witnesses:
F. R. CORRIGAN,
B. T. GREGORY.